United States Patent
Carandang et al.

(10) Patent No.: US 12,351,316 B2
(45) Date of Patent: Jul. 8, 2025

(54) INTEGRALLY FORMED TRAY TABLE WITH FLEXURAL HINGES

(71) Applicant: B/E Aerospace, Inc., Winston-Salem, NC (US)

(72) Inventors: Daniel Emmanuel M Carandang, Makati (PH); Jovennie V Campomanes, Bacolod (PH); Rajesh Mohanam, Hyderabad (IN); Jenesis B Suministrado, Binan (PH)

(73) Assignee: B/E Aerospace, Inc., Winston-Salem, NC (US)

( * ) Notice: Subject to any disclaimer, the term of this patent is extended or adjusted under 35 U.S.C. 154(b) by 259 days.

(21) Appl. No.: 18/104,922

(22) Filed: Feb. 2, 2023

(65) Prior Publication Data

US 2023/0312103 A1 Oct. 5, 2023

(30) Foreign Application Priority Data

Apr. 1, 2022 (IN) .............................. 202241019969

(51) Int. Cl.
*B64D 11/06* (2006.01)
*B33Y 80/00* (2015.01)
(Continued)

(52) U.S. Cl.
CPC .......... *B64D 11/0638* (2014.12); *B33Y 80/00* (2014.12); *A47C 7/68* (2013.01);
(Continued)

(58) Field of Classification Search
CPC ........ B60N 3/001; B60N 3/002; B60N 3/004; B60N 3/007; B64D 11/00152;
(Continued)

(56) References Cited

U.S. PATENT DOCUMENTS 4,739,960 A 4/1988 Adler
5,443,018 A * 8/1995 Cromwell .............. B60N 3/004
108/44
(Continued)

FOREIGN PATENT DOCUMENTS

DE 3334314 A1 4/1985
DE 102009052593 A1 5/2011
(Continued)

OTHER PUBLICATIONS

Pan et al., "Design and analyze of flexure hinges based on triply periodic minimal surface lattice", Precision Engineering, vol. 68, 2021, pp. 338-350, ISSN 0141-6359, https://doi.org/10.1016/j.precisioneng.2020.12.019. (https://www.sciencedirect.com/science/article/pii/S0141635920310217).

(Continued)

*Primary Examiner* — Syed A Islam
(74) *Attorney, Agent, or Firm* — Suiter Swantz IP

(57) ABSTRACT

A tray table for an aircraft and a method of manufacturing the same are disclosed. The tray table comprises a base portion, a first tray table portion, and a second tray table portion. A first flexural hinge pivots the first tray table portion relative to the base portion. A second flexural hinge pivots the second tray table portion relative to the first tray table portion. The first flexural hinge and the second flexural hinge comprise flexural members which are pliable to enable the respective flexural hinge to pivot. The base portion, the first surface portion, the first flexural hinge, the second surface portion, and the second flexural hinge are integrally formed to provide a unitary tray table construction.

19 Claims, 4 Drawing Sheets

(51) Int. Cl.
| | |
|---|---|
| A47C 7/68 | (2006.01) |
| A47C 20/02 | (2006.01) |
| B29C 64/124 | (2017.01) |
| B29L 31/30 | (2006.01) |
| B29L 31/44 | (2006.01) |
| B33Y 10/00 | (2015.01) |
| B60N 3/00 | (2006.01) |

(52) U.S. Cl.
CPC .......... *A47C 20/028* (2013.01); *B29C 64/124* (2017.08); *B29L 2031/3076* (2013.01); *B29L 2031/448* (2013.01); *B33Y 10/00* (2014.12); *B60N 3/001* (2013.01)

(58) Field of Classification Search
CPC ... B64D 11/0605; B64D 11/0638; A47C 7/68; A47C 20/028
See application file for complete search history.

(56) References Cited

U.S. PATENT DOCUMENTS

| | | | |
|---|---|---|---|
| 5,695,240 A * | 12/1997 | Luria | B64D 11/0636 |
| | | | 297/163 |
| 5,876,092 A | 3/1999 | An | |
| 8,794,162 B2 * | 8/2014 | Hisata | B64D 11/00 |
| | | | 108/165 |
| 8,991,319 B2 | 3/2015 | Korpi | |
| 10,070,717 B2 * | 9/2018 | De Saulles | A47B 31/06 |
| 10,150,566 B2 * | 12/2018 | Kretzschmar | B60N 3/004 |
| 10,279,746 B2 * | 5/2019 | Barbot | B62D 25/145 |
| 10,322,656 B2 * | 6/2019 | Pitcole | B60N 3/004 |
| 10,394,050 B2 | 8/2019 | Rasschaert et al. | |
| 11,912,187 B2 * | 2/2024 | Berg | B60N 3/007 |
| 2020/0039409 A1 | 2/2020 | Brooks et al. | |

FOREIGN PATENT DOCUMENTS

| | | |
|---|---|---|
| EP | 3269589 A1 | 1/2018 |
| WO | 2013142235 A1 | 9/2013 |

OTHER PUBLICATIONS

Extended European Search Report dated Aug. 1, 2023; European Application No. 23163115.1.

* cited by examiner

INTEGRALLY FORMED TRAY TABLE WITH FLEXURAL HINGES

RELATED APPLICATION AND INCORPORATION BY REFERENCE

This U.S. nonprovisional application claims the benefit of priority of Indian Patent Application Number 202241019969 filed Apr. 1, 2022 entitled INTEGRALLY FORMED TRAY TABLE WITH FLEXURAL HINGES, the entirety of which is incorporated by reference.

BACKGROUND

Conventional aircraft tray table designs (e.g., installed in economy class seating) include multiple separate sub-assemblies. One example is a conventional tray table that splits into two sections, with a conventional hinge at the intersection of the two sections. An improved tray table that reduces components, materials, weight and cost, while also increasing the ease of installation, removal, rework, and customer experience is desirable.

SUMMARY

A tray table for an aircraft is disclosed in accordance with one or more illustrative embodiments of the present disclosure.

In one illustrative embodiment, the tray table comprises a base portion. A hinge is configured to connect the base portion to an aircraft seat frame. The hinge is configured to pivot the base portion with respect to the aircraft seat frame. In another illustrative embodiment, the tray table comprises a first surface or tray table portion. In another illustrative embodiment, the tray table comprises a first flexural hinge. The first flexural hinge connects the first surface portion to the base portion. The first flexural hinge is configured to pivot the first surface portion with respect to the base portion. In another illustrative embodiment, the tray table comprises a second surface or tray table portion. In another illustrative embodiment, the tray table comprises a second flexural hinge. The second flexural hinge is configured to connect the second surface portion to the first surface portion. The second flexural hinge is configured to pivot the second surface portion with respect to the first surface portion.

The first flexural hinge comprises first flexural members. The first flexural members are pliable to enable the first flexural hinge to pivot. The second flexural hinge comprises second flexural members. The second flexural members are pliable to enable the second flexural hinge to pivot. The base portion, the first surface portion, the first flexural hinge, the second surface portion, and the second flexural hinge are a single unitary structure.

A method of 3D printing the tray table is also disclosed. The method may be performed by stereolithography (SLA).

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 2:
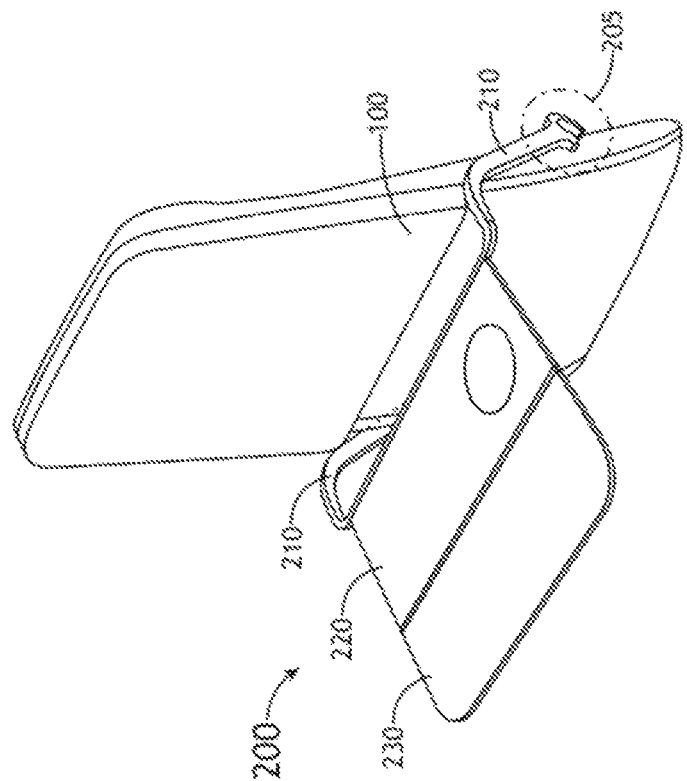
FIG. 2 is a perspective view illustrating a tray table for an aircraft in a deployed position, in accordance with one or more embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Embodiments of the present disclosure are directed to a tray table and a method of manufacturing the same. The tray table may be a single-structured compliant mechanism employing flexural hinges. The flexural hinges may be configured to provide motion (e.g., a pivot) between two adjacent portions/members by elastic deformation. The flexural hinges may be folding points when deploying the tray table (when in use) or when stowing the tray table. The tray table may be a single, unitary structure, and the components of the tray table may be manufactured using the same material.

The present tray table and method provide several advantages. Deployment of the tray table may require less resultant force during stowage & deployment compared to a conventional tray table that comprises several separate parts. Since the present tray table has fewer parts than a conventional tray table, the present tray table may reduce weight (which may add up to significant weight savings on an aircraft when scaled across hundreds of passenger seats). The present tray table may be easier to manufacture using modern additive manufacturing (e.g., 3D printing). In particular, stereolithography (SLA) may enable the manufacture of precise and quality finished products in a short time. The combination of advantages described above reduces costs and may lead to other uses for compliant mechanisms (e.g., other uses that are not immediately intuitive).

Figure 1:
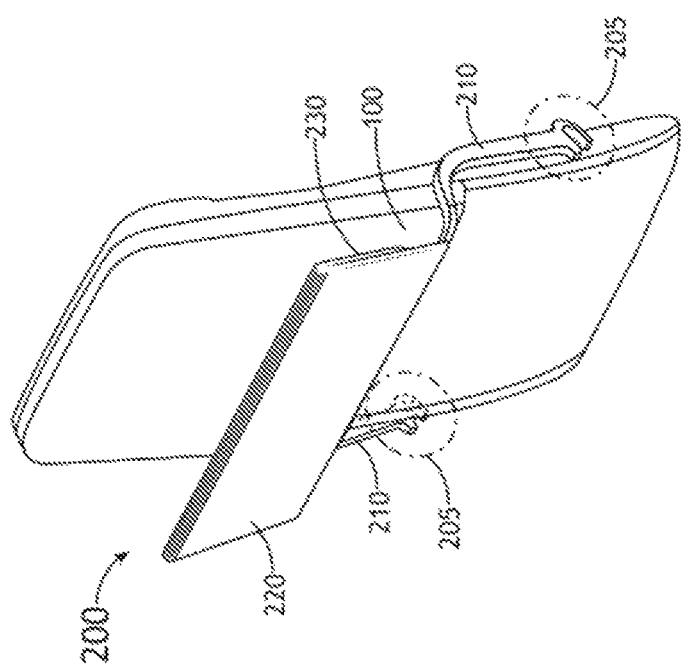
FIG. 1 is a perspective view illustrating a tray table for an aircraft in a stowed position, in accordance with one or more embodiments of the present disclosure.

FIGS. 1-2 are perspective views respectively illustrating a tray table 200 for an aircraft in a stowed position and a deployed position, in accordance with one or more embodiments of the present disclosure. The tray table 200 may comprise a base portion 210, a first surface portion 220, and a second surface portion 230. The tray table 200 may be connected to an aircraft seat frame 100 via a hinge 205.

The hinge 205 may be configured to connect the base portion 210 to the aircraft seat frame 100. The hinge 205 may be configured to pivot the base portion 210 with respect to the aircraft seat frame 100. The hinge 205 may include, for example, a bolt mechanism that rotates within a void or cavity and that is configured to secure or attach the base portion 210 to the frame 100. In some embodiments, the base portion 210 may comprise a "U" shape with a straight section, and two curved sections connecting the straight section to the frame 100.

The first surface portion 220 and second surface portion 230 are configured to be flat surfaces (e.g., for holding food, water, a book, etc.) when a user deploys the tray table 200. The first surface portion 220 and the second surface portion 230 are configured to fold in toward the aircraft seat frame 100 to stow the tray table 200, and to fold out away from the aircraft seat frame 100 to deploy the tray table 200.

The first surface portion 220 and the second surface portion 230 may comprise a substantially rectangular cuboid shape having fillet edges or rounded or chamfered corners (although the portions 220, 230 are not limited thereto). In some embodiments, the rectangular-cuboid shape may have a length at least 10 times longer than the thickness and a width at least 10 times longer than the thickness.

Figure 3:
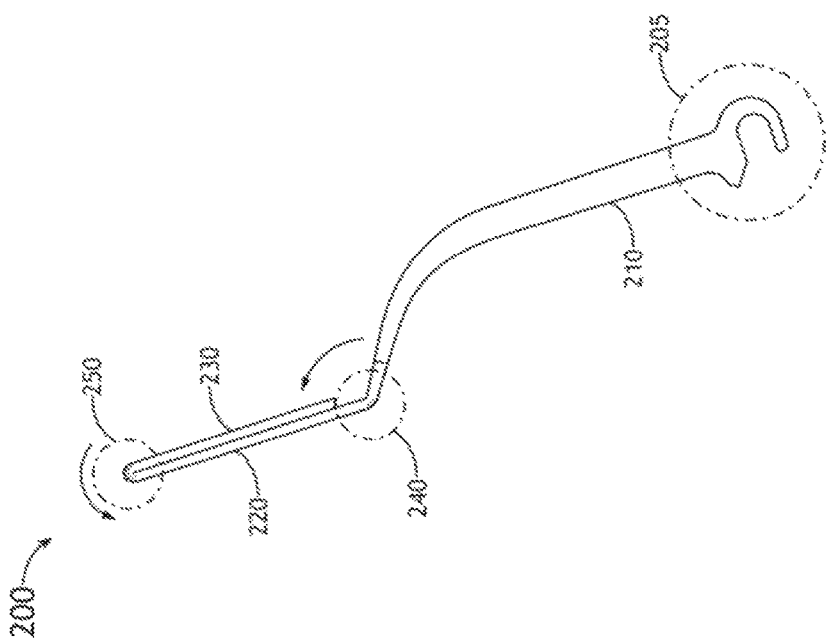
FIG. 3 is a side view illustrating a tray table for an aircraft in a stowed position, in accordance with one or more embodiments of the present disclosure.

FIG. 3 is a side view illustrating the tray table 200 in the stowed position, in accordance with one or more embodiments of the present disclosure. The tray table 200 may include flexural hinges 240 and 250. To begin deploying the tray table 100, a user may rotate the tray table 200 away from the frame 100.

Figure 4A:
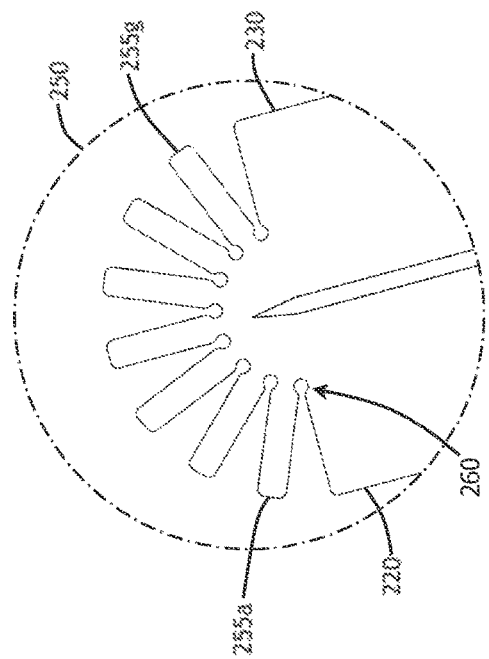
FIGS. 4A-4B are detailed views of FIG. 3 illustrating flexural hinges showing the configuration of flexural members in a stowed position of a tray table, in accordance with one or more embodiments of the present disclosure.
Figure 4B:
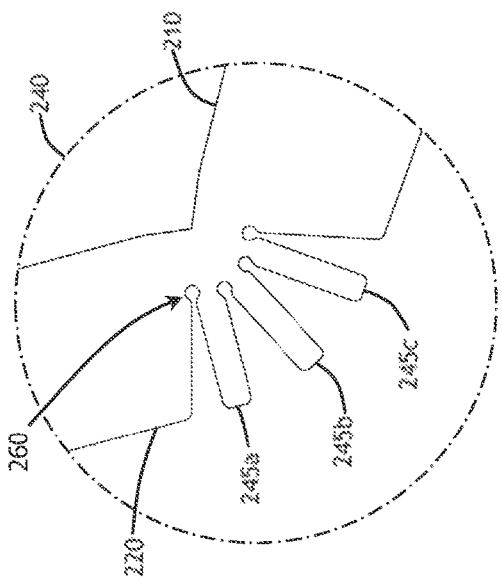

FIGS. 4A-4B are side views respectively illustrating the flexural hinges 240, 250 showing the configuration of flexural members 245a-c, 255a-g in the stowed position of the tray table 200, in accordance with one or more embodiments of the present disclosure. As shown, the flexural members 245a-c, 255a-g may have gaps in between each member 245a-c, 255a-g when the table 200 is in the stowed position. Also as shown, substantially circular material voids 260 may be formed proximal the attached ends of each flexural member 245a-c, 255a-g. In some embodiments, each flexural member 245a-c, 255a-g may taper slightly toward its detached end. The flexural members 245a-c may be pliable to enable the flexural hinge 240 to pivot, and the flexural members 255a-g may be pliable to enable the second flexural hinge to pivot.

Each of the flexural members 245a-c, 255a-g may have a substantially rectangular-cuboid shape (e.g., a bar shape). In some embodiments, the substantially rectangular-cuboid shape may have a length at least 10 times longer than the width, and a length at least 10 times longer than the thickness. Although three members 245a-c and seven members 255a-g are shown, it is contemplated that the members 245a-c, 255a-g may comprise any number of members.

Figure 5:
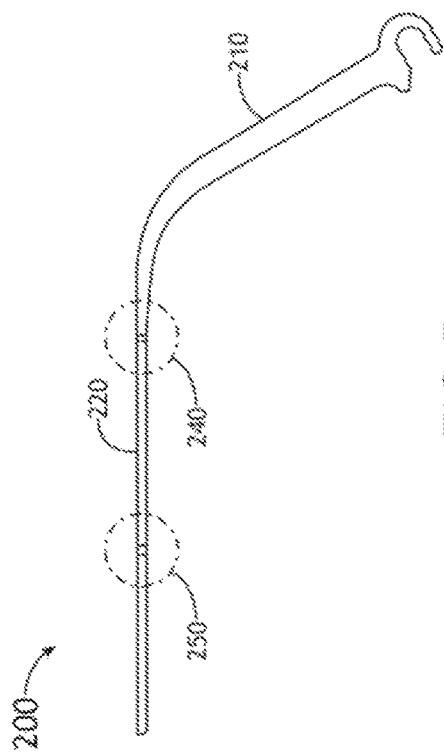
FIG. 5 is a side view illustrating a tray table for an aircraft in a deployed position, in accordance with one or more embodiments of the present disclosure.

FIG. 5 is a side view illustrating the tray table 200 in the deployed position, in accordance with one or more embodiments of the present disclosure. In the deployed position, a user may place items (i.e., food tray, laptop, phone, beverage, etc.) on the flat surface portions 220, 230 without the risk of spilling or dropping.

Figure 6A:
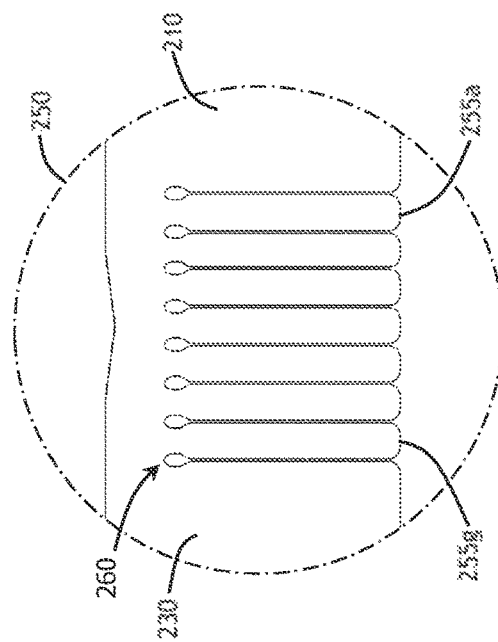
FIGS. 6A-6B are detailed views of FIG. 5 illustrating flexural hinges showing the configuration of flexural members in a deployed position of a tray table, in accordance with one or more embodiments of the present disclosure.
Figure 6B:
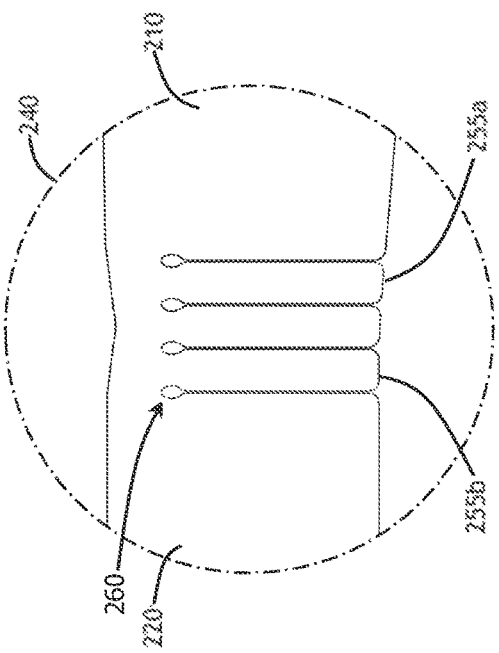

FIGS. 6A-6B are side views respectively illustrating the flexural hinges 240, 250 showing the configuration of flexural members 245a-c, 255a-g in the deployed position of the tray table 200, in accordance with one or more embodiments of the present disclosure. As shown, the flexural members 245a-c, 255a-g may be substantially adjacent to each other when the table 200 is in the deployed position, no (zero) gaps may be between each member 245a-c, 255a-g, and the substantially circular voids 260 may deform slightly (e.g., elongate). In this way, the sidewalls of each member 245a-c, 255a-g may exert pressure on each other, which may provide stability (sturdiness) to the tray table 200.

Figure 7:
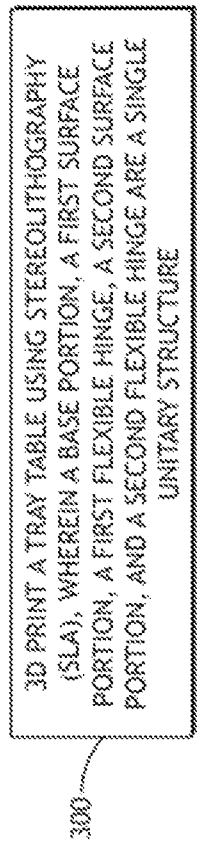
FIG. 7 is a flowchart illustrating a method of manufacturing a tray table for an aircraft, in accordance with one or more embodiments of the present disclosure.

FIG. 7 is a flowchart illustrating a method of manufacturing a tray table for an aircraft, in accordance with one or more embodiments of the present disclosure. At 300, the method comprises 3D printing a tray table using stereolithography (SLA) or other additive manufacturing process. The tray table may be printed so that a base portion, a first surface portion, a first flexible hinge, a second surface portion, and a second flexible hinge are a single unitary structure. The tray table may comprise a single material, for example an engineering resin such as nylon polyamide (PA), however other materials are also contemplated herein.

It is noted herein that the term "length" may be construed as the largest dimension of a given 3-dimensional structure or feature. The term "width" may be construed as the second largest dimension of a given 3-dimensional structure or feature. The term "thickness" may be construed as a smallest dimension of a given 3-dimensional structure or feature. A "major surface" may be construed as a surface defined by the two largest dimensions of a given structure or feature, which in the case of a structure or feature having a circular surface, may be defined by the radius of the circle.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A tray table for an aircraft, comprising:
   a base portion attachable to an aircraft seat frame via a hinge, the hinge operative to pivot the base portion relative to the aircraft seat frame;
   a first tray table portion;
   a first flexural hinge connecting the first tray table portion to the base portion, the first flexural hinge operative to pivot the first tray table portion relative to the base portion;
   a second tray table portion; and
   a second flexural hinge connecting the second tray table portion to the first tray table portion, the second flexural hinge operative to pivot the second tray table portion relative to the first tray table portion;
   wherein the first flexural hinge comprises first flexural members which are pliable to enable the first flexural hinge to pivot;
   wherein the second flexural hinge comprises second flexural members which are pliable to enable the second flexural hinge to pivot; and
   wherein the base portion, the first tray table portion, the first flexural hinge, the second tray table portion, and the second flexural hinge are integrally formed.

2. The tray table according to claim 1, wherein each of the first flexural members and each the second flexural members have a substantially rectangular-cuboid shape.

3. The tray table according to claim 2, wherein the substantially rectangular-cuboid shape has a length, a width, and a thickness, and wherein the length is at least 10 times longer than the width, and wherein the length is at least 10 times longer than the thickness.

4. The tray table according to claim 1, wherein each of the first tray table portion and the second tray table portion have a substantially rectangular-cuboid shape.

5. The tray table according to claim 4, wherein the substantially rectangular-cuboid shape has a length, a width, and a thickness, wherein the length is at least 10 times longer than the thickness, wherein the width is at least 10 times longer than the thickness.

6. The tray table according to claim 1, wherein the tray table comprises nylon polyamide (PA).

7. The tray table according to claim 1, further comprising substantially circular material voids formed proximal attached ends of each of the first flexural members and each the second flexural members.

8. The tray table according to claim 1, wherein detached ends of each of the first flexural members and each of the second flexural members comprise fillet edges.

9. The tray table according to claim 1, wherein the first tray table portion is configured to fold against the second tray table portion to stow the tray table, and wherein the first and second tray table portions are coplanar in a deployed condition of the tray table.

10. The tray table according to claim 1, wherein the second tray table portion pivots about 180 degrees relative to the first tray table portion between stowed and deployed conditions of the tray table, and the first tray table portion pivots about 90 degrees relative to the base portion between the stowed and deployed conditions of the tray table.

11. A method of manufacturing a tray table for an aircraft using an additive manufacturing process, the tray table comprising:
    a base portion attachable to an aircraft seat frame via a hinge, the hinge operative to pivot the base portion relative to the aircraft seat frame;
    a first tray table portion;
    a first flexural hinge connecting the first tray table portion to the base portion, the first flexural hinge operative to pivot the first tray table portion relative to the base portion;
    a second tray table portion; and
    a second flexural hinge connecting the second tray table portion to the first tray table portion, the second flexural hinge operative to pivot the second tray table portion relative to the first tray table portion;
    wherein the first flexural hinge comprises first flexural members which are pliable to enable the first flexural hinge to pivot;
    wherein the second flexural hinge comprises second flexural members which are pliable to enable the second flexural hinge to pivot; and
    wherein the base portion, the first tray table portion, the first flexural hinge, the second tray table portion, and the second flexural hinge are integrally formed.

12. The method according to claim 11, wherein the additive manufacturing process comprises stereolithography (SLA).

13. The method according to claim 11, wherein each of the first flexural members and each of the second flexural members have a substantially rectangular-cuboid shape having fillet edges.

14. The method according to claim 13, wherein the substantially rectangular-cuboid shape has a length, a width, and a thickness, wherein the length is at least 10 times longer than the width, and wherein the length is at least 10 times longer than the thickness.

15. The method according to claim 11, wherein each of the first tray table portion and the second tray table portion have a substantially rectangular cuboid shape.

16. The method according to claim 15, wherein the substantially rectangular-cuboid shape has a length, a width, and a thickness, wherein the length is at least 10 times longer than the thickness, wherein the width is at least 10 times longer than the thickness.

17. The method according to claim 11, further comprising substantially circular material voids formed proximal attached ends of each of the first flexural members and each the second flexural members.

18. The method according to claim 11, wherein the first tray table portion is configured to fold against the second tray table portion to stow the tray table, and wherein the first and second tray table portions are coplanar in a deployed condition of the tray table.

19. The method according to claim 11, wherein the second tray table portion pivots about 180 degrees relative to the first tray table portion between stowed and deployed conditions of the tray table, and the first tray table portion pivots about 90 degrees relative to the base portion between the stowed and deployed conditions of the tray table.

\* \* \* \* \*